April 1, 1958 — J. D. TURLAY — 2,829,017
PISTON
Filed Nov. 24, 1954
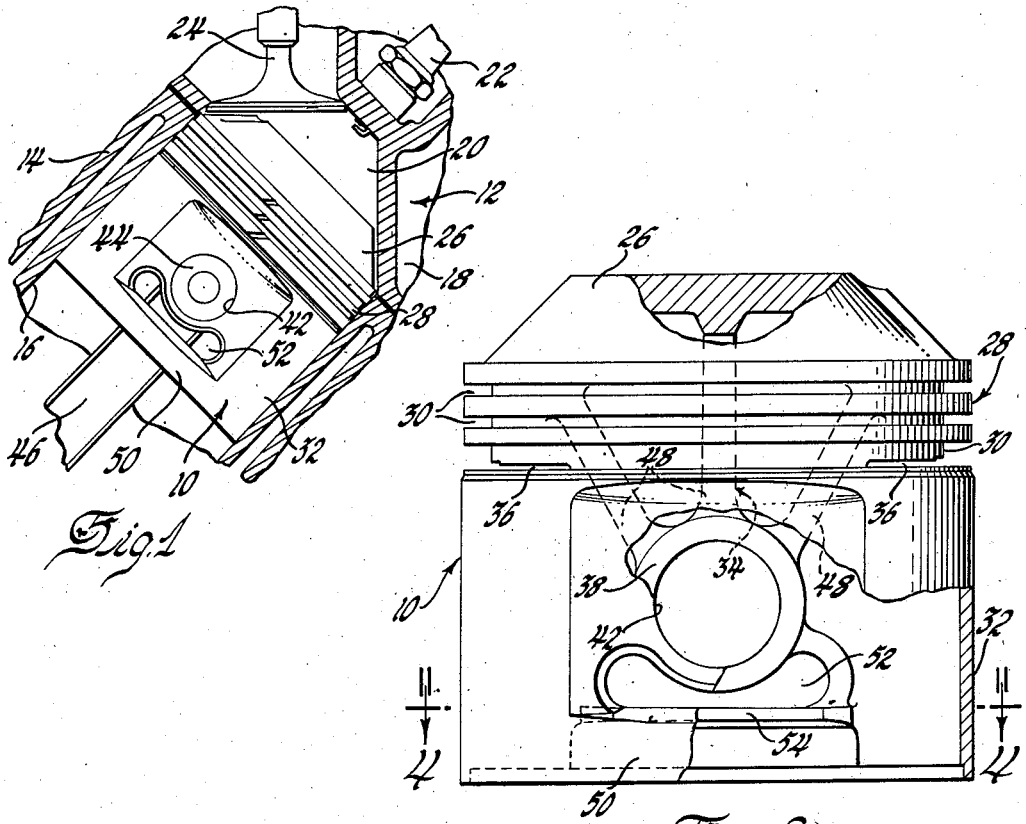
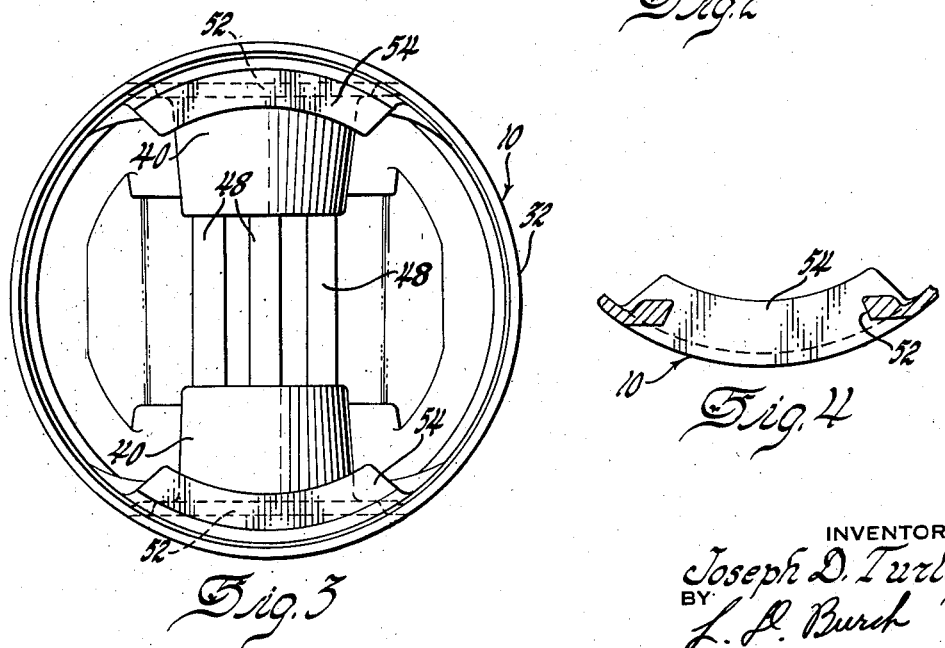
INVENTOR
Joseph D. Turlay
BY L. D. Burch
ATTORNEY ns # United States Patent Office 2,829,017
Patented Apr. 1, 1958

2,829,017

PISTON

Joseph D. Turlay, Flint, Mich., assignor to General Motors Corporation, Detroit, Mich., a corporation of Delaware Application November 24, 1954, Serial No. 471,029

6 Claims. (Cl. 309—10)

The present invention relates to internal combustion engines and more particularly to pistons therefor.

In a reciprocating engine the piston is normally attached to one end of a connecting rod. The opposite end of this connecting rod is attached to a rotating crankshaft, and as a result, there will be several lateral forces imposed on the piston. Since there is of necessity a working clearance between the piston and the cylinder walls, these forces will cause the piston to move from one cylinder wall to another. It has been found that in a piston of the so-called trunk type, i. e., the bottom of the skirt is circumferentially continuous, the piston rings and the bottom of the skirt will be very effective for maintaining the piston in axial alignment and by providing clearance spaces as small as possible, the amount of lateral movement of the piston may be maintained at a minimum. However, heretofore, it has been necessary for this clearance space to be large enough to allow the shape of the piston to change as a result of thermal expansion and also as a result of the structural forces imposed thereon by the connecting rod. If the clearance space is not adequate, the changes in piston shape will cause excessive pressures on the cylinder walls thus resulting in increased friction losses and wear.

It is now proposed to provide a piston of the so-called trunk type that will permit the clearance space to be greatly reduced so that the lower end of the piston skirt may be maintained as close as possible to the cylinder walls. This is to be accomplished by making the lower end of the skirt circumferentially continuous and also structurally isolating this end from any forces present in the piston. Thus even if these forces produce any distortion of the piston, the lower end of the piston will still retain its shape. In the present instance a circumferentially extending opening is provided in the bottom of each of the wrist pin bosses. These openings are preferably disposed immediately above the circumferentially continuous lower end of the skirt. This will structurally isolate the lower extremity of the skirt from the wrist pin bosses. As a result any loads imposed on the pin bosses that might cause deformation of the bosses will have little or no effect on the shape of the circumferentially continuous lower end of the skirt. In addition reinforcing ribs may be provided on the interior of the lower end of the skirt to extend around the skirt adjacent the openings and to retain the skirt circular at all times. Thus a minimum working clearance may be provided between the piston and the cylinder without increasing the friction therebetween.

In the drawings:

Figure 1 is a fragmentary cross sectional view of a portion of an engine utilizing a piston embodying the present invention.

Figure 2 is a side view, on an enlarged scale, of the piston of Figure 1 with a portion thereof being broken away.

Figure 3 is an end view of the piston of Figure 2.

Figure 4 is a fragmentary cross sectional view of the piston taken substantially along the plane of line 4—4 in Figure 2.

Referring to the drawings in more detail, the present invention may be incorporated in a piston 10 for use in any suitable reciprocating engine 12. The engine 12 may include a cylinder block 14 that has a cylinder 16 extending therethrough to form an opening in the top of the block 14. A cylinder head 18 may be secured to the block so that a cavity 20 therein will register with the open end of the cylinder 16 and form a combustion chamber of any desired shape. A spark plug 22 and valves 24 may be provided in the cylinder head 18.

The piston 10 may be reciprocably disposed in the cylinder 16 with the upper end 26 thereof cooperating with the cavity in the cylinder head to help define the combustion chamber. Of course, it should be understood that the shape of the upper end 26 of the piston 10 forms no part of the present invention and it may be given any shape suitable for defining the combustion chamber. A circumferential ring belt 28 may be provided immediately below the upper end 26 of the piston 10 for retaining a plurality of piston rings in sealing engagement with the cylinder walls. In the present instance this belt 28 includes three annular grooves 30 which are adapted to receive two compression rings and an oil ring that slidably engage the walls of the cylinder 16.

The piston 10 may include a substantially cylindrical skirt 32 that extends downwardly from the ring belt 28. The skirt 32 may be secured to the ring belt 28 by a pair of vertical piers 34 that are disposed on the diametrically opposite sides of the piston 10. The remaining portion of the upper end of the skirt 32 may be separated from the ring belt 28 by a pair of circumferentially extending slots 36 that are disposed in the bottom of the oil ring groove 30.

A pair of diametrically aligned wrist pin bosses 38 may be provided in the opposite sides of the skirt 32. In the present instance these bosses 38 are disposed below the vertical piers 34. Each pin boss 38 may include a hub-like portion 40 that projects inwardly toward the center of the piston 10 while the exteriors of the bosses 38 may have a plane outer surface that is chordally disposed with respect to the cylindrical outer surface of the skirt 32. A pair of passages may be provided in the pin bosses 38 so that they will extend through the plane outer surface and the hub portion 40 to form diametrically aligned wrist pin bearings 42. These bearings 42 are adapted to receive a wrist pin 44 disposed in the end of a connecting rod 46. Thus the piston 10 may be drivingly connected to the crankshaft by means of a connecting rod 46 having a wrist pin 44 disposed in these bearings 42. The piers 34 include ribs 48 that extend along the inside of the piers 34 from the hubs 40 to the inside of the upper end of the piston to reinforce the piers 34 for carrying the loads imposed thereon.

The lower end of the piston 10 may include a circumferentially continuous band 50 that extends completely around the piston 10 below the wrist pin bosses 38. This band 50 is preferably circular so that it will fit inside of the cylinder walls 16 with the minimum amount of working clearance therebetween. The band 50 may thus be very effective for preventing the piston 10 from moving into and out of axial alignment. In order to prevent this band from becoming out of shape and causing excessive frictional engagement with the cylinder walls 16, it may be structurally isolated from the wrist pin bearings 42 and bosses 38. In the present instance this is accomplished by means of circumferentially extending openings 52 provided in each of the pin bosses 38. These openings 52 are preferably disposed below the bearings 42 and adjacent the band 50 on the bottom of the skirt 32. The openings 52 which are symmetrical about a plane including the axis of the piston and the wrist pin bearings extend circumferentially along the band 50 and across the bottom of the bosses 38. The opposite ends of the openings 52 may extend upwardly around the sides of the bearings 42 to terminate slightly above the lower extremities thereof.

It may therefore be seen that the forces normally imposed on the pin bosses 38 by the wrist pin 44 may cause the pin bosses 38 to be distorted from their normal shape without having any material effect on the shape of the circumferentially continuous band 50 as the openings 52 will permit relative movement therebetween.

In addition, it should be noted that one or more reinforcing ribs 54 may be provided on the interior of the band 50. Thus a rib 54 may be provided below each of the openings 52 to extend circumferentially therealong. This will greatly increase the rigidity of the band 50 and thereby insure its remaining circular at all times.

It may therefore be seen that a piston has been provided which will permit the bottom end thereof to be retained circular at all times. This in turn allows the working clearance between that portion and the cylinder walls to be maintained at a minimum without any increase in the friction losses that might otherwise result from the piston being distorted.

It is to be understood that, although the invention has been described with specific reference to a particular embodiment thereof, it is not to be so limited since changes and alterations therein may be made which are within the full intended scope of this invention as defined by the appended claims.

What is claimed is:

1. A piston adapted to be reciprocably disposed in a cylinder of an engine, one end of said piston having a surface thereon adapted to form one wall of a combustion chamber, a ring belt extending around said piston adjacent said end, a substantially cylindrical skirt having one end thereof adjacent said ring belt, the opposite end of said skirt being circumferentially continuous, pin bosses formed in said skirt between said ring belt and said opposite end of said skirt, said bosses including a pair of plane chordal webs and a pair of diametrically aligned wrist pin bearings with the outer ends terminating in said webs, reinforcing ribs inside of said ring belt connected to the inner end of said bearings, each of said pin bosses including a circumferentially extending opening through said chordal webs disposed between said bearing and said opposite end of said skirt, each of said openings being symmetrical about a plane including the axis of said piston and said pin bosses.

2. A piston adapted to be reciprocably disposed in a cylinder of an engine, one end of said piston having a surface thereon adapted to form one wall of a combustion chamber, a ring belt extending around said piston adjacent said end, a substantially cylindrical skirt having one end thereof adjacent said ring belt, the opposite end of said skirt having a circumferentially continuous portion, pin bosses formed in said skirt between said ring belt and said circumferentially continuous portion, the exterior of each of said pin bosses comprising a substantially plane surface chordally disposed with respect to the cylindrical surface of said skirt and recessed inwardly therefrom, said bosses including diametrically aligned wrist pin bearings having the outer ends thereof flush with the exterior of said plane surface, said plane surface including circumferentially extending openings disposed between said bearings and said circumferentially continuous portion, each of said openings being substantially symmetrical about a plane including the axis of said piston and said pin bosses.

3. A piston adapted to be reciprocably disposed in a cylinder of an engine, one end of said piston having a surface thereon adapted to form one wall of a combustion chamber, a ring belt extending around said piston adjacent said end, a substantially cylindrical skirt having one end thereof secured to said ring belt, the opposite end of said skirt being circumfereentially continuous, pin bosses formed in said skirt between said ring belt and said circumferentially continuous end and including chordally disposed plane outer surfaces, diametrically aligned wrist pin bearings formed in said bosses with the outer ends thereof being flush with said plane surfaces, each of said pin bosses including a circumferentially extending opening disposed between said bearing and said opposite end, each of said openings being symmetrical about a plane including the axis of said piston and said bearings, and a reinforcing rib on the interior of said opposite end extending circumferentially below each of said openings.

4. A piston adapted to be reciprocably disposed in a cylinder of an engine, one end of said piston having a surface thereon adapted to form one wall of a combustion chamber, a ring belt extending around said piston adjacent said end, a substantially cylindrical skirt having one end thereof secured to said ring belt, the opposite end of said skirt having a circumferentially continuous portion, pin bosses formed in said skirt between said ring belt and said circumferentially continuous portion, each of said pin bosses having an exterior which is a plane chordally disposed surface recessed inwardly from the cylindrical surface of said skirt, diametrically aligned wrist pin bearings formed in said bosses with the outer ends thereof being flush with said chordal surface, each of said pin bosses including a circumferentially extending opening disposed between said bearing and said circumferentially continuous portion, each of said openings being substantially symmetrical about a plane including the axis of said piston and said pin bosses, a radially inwardly extending reinforcing rib positioned on the interior of said circumferentially continuous portion immediately below each of said openings and extending circumferentially the full length of said openings.

5. A piston adapted to be reciprocably disposed in a cylinder of an engine, one end of said piston having a surface thereon adapted to form one wall of a combustion chamber, a ring belt extending around said piston adjacent said end, a substantially cylindrical skirt having one end thereof secured to said ring belt, the opposite end of said skirt being circumferentially continuous, pin bosses formed in said skirt between said ring belt and said circumferentially continuous end, said pin bosses including diametrically aligned wrist pin bearings projecting radially inwardly from said bosses, reinforcing ribs inside of said ring belt and connected to the inner ends of said bearings, and a circumferentially extending opening disposed between said bearings and said opposite end, the outer ends of said bearings being supported by said bosses and the inner ends by said ribs, each of said openings being symmetrical about a plane including the axis of said piston and said pin bosses with the opposite ends of said opening extending toward said ring belt and partially around said bearing.

6. A piston adapted to be reciprocably disposed in a cylinder of an engine, the upper end of said piston having a surface thereon adapted to form one wall of a combustion chamber, a ring belt extending around said piston immediately below said upper end, a substantially cylindrical skirt having the upper end thereof secured to said ring belt with the remainder thereof extending downwardly from said ring belt, the lower end of said skirt being circumferentially continuous, pin bosses formed in said skirt between said ring belt and said lower end, said pin bosses having a plane chordally disposed exterior surface recessed inwardly from the exterior of said cylindrical skirt, diametrically aligned wrist pin bearings formed in said bosses with the outer ends thereof flush with said exterior surface, each of said pin bosses including a circumferentially extending opening positioned adjacent the lower end thereof between said bearings and said lower end, said openings being symmetrical about a plane containing the axis of said piston and said bearings with the opposite ends of said openings extending upwardly past the lower extremities of said bearings.

References Cited in the file of this patent

UNITED STATES PATENTS

| | | |
|---|---|---|
| Re. 17,193 | Day | Jan. 15, 1929 |
| 1,256,265 | Schmiedeknecht | Feb. 12, 1918 |
| 1,610,852 | Evans | Dec. 14, 1926 |
| 1,826,185 | Mooers | Oct. 6, 1931 |
| 1,881,237 | Nelson | Oct. 4, 1932 |
| 1,885,463 | Miller | Nov. 1, 1932 |
| 1,959,648 | Tandy | May 22, 1934 |
| 2,120,090 | Day | June 7, 1938 |
| 2,394,241 | Howlett | Feb. 5, 1946 |

FOREIGN PATENTS

| | | |
|---|---|---|
| 367,855 | Great Britain | Feb. 26, 1932 |